United States Patent
Su et al.

(10) Patent No.: US 12,483,334 B2
(45) Date of Patent: *Nov. 25, 2025

(54) METHOD AND APPARATUS FOR TRANSMITTING AND RECEIVING CLIENT SIGNAL IN OPTICAL TRANSPORT NETWORK

(71) Applicant: HUAWEI TECHNOLOGIES CO., LTD., Guangdong (CN)

(72) Inventors: Wei Su, Dongguan (CN); Qiuyou Wu, Shenzhen (CN); Limin Dong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 243 days.

This patent is subject to a terminal disclaimer.

(21) Appl. No.: 18/173,990

(22) Filed: Feb. 24, 2023

(65) Prior Publication Data

US 2023/0353250 A1    Nov. 2, 2023

Related U.S. Application Data

(63) Continuation of application No. 17/122,142, filed on Dec. 15, 2020, now Pat. No. 11,595,130, which is a
(Continued)

(30) Foreign Application Priority Data

Jul. 30, 2012   (CN) .................. 201210268385.0

(51) Int. Cl.
*H04B 10/516* (2013.01)
*H04B 10/27* (2013.01)
(Continued)

(52) U.S. Cl.
CPC .......... *H04B 10/516* (2013.01); *H04B 10/27* (2013.01); *H04J 3/1652* (2013.01); *H04J 14/0298* (2013.01)

(58) Field of Classification Search
CPC .................................................. H04B 10/516
See application file for complete search history.

(56) References Cited

U.S. PATENT DOCUMENTS 7,570,643 B2    8/2009  Prasad et al.
7,782,843 B2    8/2010  Zou et al.
(Continued)

FOREIGN PATENT DOCUMENTS

CN        1741429        3/2006
CN      101155016        4/2008
(Continued)

OTHER PUBLICATIONS

"Series G: Transmission Systems and Media, Digital Systems and Networks—Digital Terminal Equipments—General; Series Y: Global Information, Infrastructure, Internet Protocol Aspects and Next Generation Networks—Internet Protocol Aspects—Transport-Interfaces for the Optical Transport Network (OTN)," ITU-T Recommendation G.709/Y.1331, Mar. 2003, 118 pages.
(Continued)

*Primary Examiner* — Shi K Li
(74) *Attorney, Agent, or Firm* — Fish & Richardson P.C.

(57) ABSTRACT

Embodiments of the present invention provide a method and an apparatus for transmitting and receiving a client signal in an optical transport network. In the transmission method, a received client signal is mapped into a variable-rate container OTU-N, wherein a rate of the OTU-N is N times as high as a preset reference rate; and then, the variable-rate container OTU-N is split into N optical sub-channel transport units OTUsubs by column, where a rate of each
(Continued)

OTUsub equals to the reference rate; next, the N optical sub-channel transport units OTUsubs are modulated onto one or more optical carriers; at last, the one or more optical carriers is transmitted through a fiber.

17 Claims, 13 Drawing Sheets

Related U.S. Application Data continuation of application No. 16/280,444, filed on Feb. 20, 2019, now Pat. No. 10,887,020, which is a continuation of application No. 15/373,005, filed on Dec. 8, 2016, now Pat. No. 10,256,915, which is a continuation of application No. 14/609,232, filed on Jan. 29, 2015, now Pat. No. 9,531,477, which is a continuation of application No. PCT/CN2013/071898, filed on Feb. 26, 2013.

(51) Int. Cl.
*H04J 3/16* (2006.01)
*H04J 14/02* (2006.01)

(56) References Cited

U.S. PATENT DOCUMENTS

| | | | |
|---|---|---|---|
| 7,787,448 B2 | 8/2010 | Zhang | |
| 7,848,653 B2 | 12/2010 | Zou | |
| 7,877,011 B2 | 1/2011 | Fukashiro | |
| 7,978,712 B2 | 7/2011 | Dong et al. | |
| 8,213,446 B2 | 7/2012 | Meagher et al. | |
| 8,446,922 B2 | 5/2013 | Yin | |
| 8,542,708 B1* | 9/2013 | Mok | H04J 3/0697 370/506 |
| 8,689,085 B2 | 4/2014 | Shin et al. | |
| 8,934,479 B2 | 1/2015 | Valiveti et al. | |
| 9,001,847 B2 | 4/2015 | Shin et al. | |
| 9,014,151 B2 | 4/2015 | Zou | |
| 9,231,721 B1 | 1/2016 | Varadarajan et al. | |
| 9,300,429 B2 | 3/2016 | Abbas et al. | |
| 2003/0016416 A1 | 1/2003 | Wolf | |
| 2007/0104485 A1 | 5/2007 | Zhang | |
| 2007/0189336 A1 | 8/2007 | Zou | |
| 2009/0074410 A1 | 3/2009 | Zou et al. | |
| 2009/0169204 A1 | 7/2009 | Meagher et al. | |
| 2009/0169217 A1 | 7/2009 | Meagher et al. | |
| 2009/0208208 A1 | 8/2009 | Chen | |
| 2010/0040370 A1 | 2/2010 | Aoki et al. | |
| 2010/0142947 A1 | 6/2010 | Shin et al. | |
| 2010/0158519 A1 | 6/2010 | Dong | |
| 2010/0221005 A1 | 9/2010 | Zhao | |
| 2010/0226652 A1 | 9/2010 | Vissers et al. | |
| 2011/0013911 A1* | 1/2011 | Alexander | H04J 14/0305 398/79 |
| 2011/0123196 A1 | 5/2011 | Ye et al. | |
| 2011/0135305 A1* | 6/2011 | Barnard | H04J 14/0293 398/49 |
| 2011/0318001 A1* | 12/2011 | Li | H04L 49/25 398/43 |
| 2012/0002671 A1 | 1/2012 | Xiao et al. | |
| 2012/0082455 A1 | 4/2012 | Bardalai | |
| 2012/0106956 A1 | 5/2012 | Rao et al. | |
| 2012/0134674 A1 | 5/2012 | Shin | |
| 2012/0246537 A1 | 9/2012 | Kubo | |
| 2013/0121700 A1 | 5/2013 | Dong et al. | |
| 2013/0195458 A1 | 8/2013 | Luo | |
| 2014/0161463 A1 | 6/2014 | Dong et al. | |
| 2015/0093113 A1 | 4/2015 | Vissers et al. | |
| 2015/0139650 A1 | 5/2015 | Su et al. | |

FOREIGN PATENT DOCUMENTS

| | | |
|---|---|---|
| CN | 101841741 | 9/2010 |
| CN | 101841749 | 9/2010 |
| CN | 102511171 | 6/2012 |
| CN | 102820951 | 12/2012 |
| EP | 1826926 | 8/2007 |
| EP | 2075937 | 7/2009 |
| EP | 2388964 | 11/2011 |
| JP | 2010050803 | 3/2010 |
| JP | 2010114691 | 5/2010 |
| JP | 2010114765 | 5/2010 |
| JP | 2010136380 | 6/2010 |
| JP | 2011041104 | 2/2011 |
| JP | 2011223454 | 11/2011 |
| RU | 2439708 | 1/2012 |
| WO | WO2008154310 | 12/2008 |
| WO | WO2009155870 | 12/2009 |
| WO | WO2010111958 | 10/2010 |
| WO | WO2011032315 | 3/2011 |

OTHER PUBLICATIONS

"Series G: Transmission Systems and Media, Digital Systems and Networks—Digital Terminal Equipments—General; Series Y: Global Information, Infrastructure, Internet Protocol Aspects and Next Generation Networks—Internet Protocol Aspects—Transport-Interfaces for the Optical Transport Network (OTN)," ITU-T Recommendation G.709/Y.1331, Dec. 2009, 218 pages.

"Series G: Transmission Systems and Media, Digital Systems and Networks—Digital Terminal Equipments—General; Series Y: Global Information, Infrastructure, Internet Protocol Aspects and Next Generation Networks—Internet Protocol Aspects—Transport-Interfaces for the Optical Transport Network (OTN)," ITU-T Recommendation G.709/Y.1331, Feb. 2012, 238 pages.

"Series G: Transmission Systems and Media, Digital Systems and Networks—Transmission Media Characteristics—Characteristics of Optical Components and Subsystems—Spectral Grids for WDM Applications: CWDM Wavelength Grid," ITU-T Recommendation ITU-T G.694.2, 12 pages.

Extended European Search Report issued in European Application No. 19172818.7 on Feb. 13, 2020, 9 pages.

Goh et al.; "Novel Flexible-Format Optical Modulator with Selectable Combinations of Carrier Numbers and Modulation Levels Based on Silica-PLC and LiNbO3 Hybrid Integration," Optical Fiber Communication Conference and Exposition (OFC/NFOEC), Los Angeles, California, USA, Mar. 6-10, 2011, 3 pages.

Infinera Corporation et al., "Flexible Rate OTU signal," ITU COM 15—C 1573—E Rev.1, Study Group 15—Contribution 1573 Rev. 1, Study Period 2009-2012, Nov. 2011, 6 pages.

Jinno et al., "Introducing Elasticity and Adaptation into the Optical Domain Toward More Efficient and Scalable Optical Transport Networks," Kaleidoscope: Beyond the Internet?—Innovations for Future Networks and Services, 2010 ITU-T, Pune, India, Dec. 13-15, 2010; 7 pages.

Jinno et al., "Spectrum-Efficient and Scalable Elastic Optical Path Network: Architecture, Benefits, and Enabling Technologies," IEEE Communications Magazine, Nov. 2009, 8 pages.

Newsome, "Additional Material for G.aon," Ciena Corporation, WD 08 Document, Oct. 4, 2010, 4 pages.

Ohara et al., "OTN technology for multi-flow optical transponder in elastic 400G/IT transmission era," OFC/NFOEC Technical Digest, Mar. 14, 2012, 4 pages.

"Series G: Transmission Systems and Media, Digital Systems and Networks—Transmission Media and Optical Systems Characteristics—Characteristics of Optical Systems—Spectral Grids for WDM Applications: DWDM Frequency Grid," ITU-T Recommendation ITU-T G.694.1, ITU-T G.694.1, Feb. 2012, 16 pages.

Takara et al., "Experimental Demonstration of 400 GB/s Multi-flow, Multi-rate, Multi-reach Optical Transmitter for Efficient Elastic

(56) References Cited

OTHER PUBLICATIONS

Spectral Routing," Optical Society of America, ECOC Technical Digest, 2011, 3 pages.

* cited by examiner

FAS: Frame alignment signal, frame alignment signal
MFAS: Multiframe alignment signal, multiframe alignment signal
SM: section monitoring, section monitoring
GCC0: general communication channel 0, general communication channel 0
RES: reserved overhead, reserved overhead PM: path monitoring TCM: tandem connection monitoring GCC: general communication channels APS/PCC: automatic protection switching and protection communication channel FTFL: fault type and fault location reporting communication channe EXP: experimental overhead ACT: Activation

METHOD AND APPARATUS FOR TRANSMITTING AND RECEIVING CLIENT SIGNAL IN OPTICAL TRANSPORT NETWORK

CROSS-REFERENCE TO RELATED APPLICATIONS

This application is a continuation of U.S. patent application Ser. No. 17/122,142, filed on Dec. 15, 2020, which is a continuation of U.S. patent application Ser. No. 16/280,444, filed on Feb. 20, 2019, now U.S. patent Ser. No. 10/887,020, which is a continuation of U.S. patent application Ser. No. 15/373,005, filed on Dec. 8, 2016, now U.S. Pat. No. 10,256,915, which is a continuation of U.S. patent application Ser. No. 14/609,232, filed on Jan. 29, 2015, now U.S. Pat. No. 9,531,477, which is a continuation of International Application No. PCT/CN2013/071898, filed on Feb. 26, 2013, which claims priority to Chinese Patent Application No. 201210268385.0, filed on Jul. 30, 2012. All of the afore-mentioned patent applications are hereby incorporated by reference in their entireties.

TECHNICAL FIELD

The present invention relates to the field of optical transport networks, and in particular, to a method and an apparatus for transmitting and receiving a client signal in an optical transport network.

BACKGROUND

As a core technology of a next-generation transport network, an OTN (Optical transport network) includes electric-layer and optical-layer technical specifications, features diverse OAM (Operation, Administration and Maintenance,), and is capable of powerful TCM (Tandem Connection Monitoring) and outband FEC (Forward Error Correction), allowing flexible scheduling and management for large-capacity services.

On an electric processing layer, the OTN technology defines a standard encapsulation structure, which maps various client services, and can implement management and monitoring for client signals. An OTN frame structure is shown in FIG. 1, the OTN frame is a structure of 4×4080 bytes, that is, 4 rows×4080 columns. The OTN frame structure includes a frame delimiting area, OTUk (Optical Channel Transport Unit) OH (Overhead), ODUk (Optical Channel Data Unit) OH, OPUk (Optical Channel Payload Unit) OH, an OPUk payload area (Payload Area), and a FEC area, where values 1, 2, 3, and 4 of k correspond to rate levels 2.5 G, 10 G, 40 G, and 100 G respectively. The frame delimiting area includes an FAS (Frame Alignment Signal) and an MFAS (Multi-frame Alignment Signal), information in the OPUk OH is primarily used for mapping and adaptation management of a client service, information in the ODUk OH is primarily used for managing and monitoring an OTN frame, and information in the OTUk OH is primarily used for monitoring a transmission section. A fixed rate of the OTUk is called a line interface rate. Currently, line interface rates of four fixed rate levels 2.5 G, 10 G, 40 G, and 100 G exist. The OTN transmits a client signal in the following manner: mapping an upper-layer client signal to an OPUj of a lower rate level and adding OPUj overhead and ODUj overhead to form an ODUj, which is herein called a lower-order ODUj; and then mapping the lower-order ODUj to an OPUk of a higher rate level, and adding OPUk overhead, ODUk overhead, OTUk overhead, and a FEC to form a constant-rate OTUk, where the OTUk is called a higher-order OTUk; and modulating the higher-order OTUk onto a single optical carrier for transmission, where a bearer bandwidth of the optical carrier is equal to a fixed rate of the higher-order OTUk. In addition, an ODUflex is introduced in an existing OTN, and is called a lower-order variable-rate optical channel data unit, and is used to carry an upper-layer service of any rate. The lower-order ODUflex needs to be mapped to the higher-order OPUk first, and the OPUk overhead, the ODUk overhead, the OTUk overhead, and the FEC are added to form a constant-rate higher-order OTUk, and then the higher-order OTUk is modulated onto a single optical carrier for transmission.

Massive increase and flexible change of upper-layer client IP (Internet Protocol) services impose challenges to an optical transport network system. Currently, optical spectrum resources are divided according to 50 GHz optical spectrum grid bandwidths, and a 50 GHz optical spectrum grid bandwidth is allocated to each optical carrier. For optical carriers whose bearer bandwidths fall within the four fixed rate levels 2.5 G, 10 G, 40 G, and 100 G, optical spectrum width occupied by the optical carriers does not reach 50 GHz, and waste of optical spectrum resources exists. Moreover, the optical spectrum is a limited resource. To make full use of optical spectrum resources, improve overall transmission capabilities of a network, and fulfill increasing upper-layer client IP (Internet Protocol, protocol for interconnection between networks) service transmission, a Flex Grid (flexible grid) technology is introduced into an optical layer to extend the optical spectrum grid bandwidth division of the optical spectrum resources from a constant 50 GHz granularity (ITU-T (International Telecommunication Union-Telecommunication Standardization Sector-telecommunication) G.694) to optical spectrum grid bandwidth division of a smaller granularity. Currently, a minimum optical spectrum grid bandwidth granularity is slot=12.5 GHz, and an optical carrier can occupy one or more continuous optical spectrum grid bandwidths. The OTN network may allocate a proper optical spectrum width according to a traffic volume of a client signal to be transmitted and a transmission distance, so as to meet transmission requirements.

In addition, persons in the art expect to increase spectrum efficiency as far as possible. To obtain higher spectrum efficiency, higher-order modulation is required, such as nQAM (n-order quadrature amplitude modulation) and an orthogonal frequency division multiplexing (OFDM, Orthogonal Frequency Division Multiplexing) technologies. That is, under a constant spectrum width, actual traffic volume requirements are fulfilled by changing an optical carrier modulation format.

However, currently an electric-layer OTN line interface has a fixed rate level, and it is not practicable to provide a line interface of a proper rate according to the actual traffic volume of the client service, and therefore, optimal configuration of optical transport network bandwidth resources is not available.

SUMMARY

Embodiments of the present invention provide a method and an apparatus for transmitting and receiving a client signal in an optical transport network.

According to one aspect, an embodiment of the present invention provides a method for transmitting a client signal in an optical transport network, where the method includes:

mapping a received client signal into a variable-rate container OTU-N, where a rate of the OTU-N is N times of a preset reference rate level, and the value N is a positive integer that is configurable as required; splitting the variable-rate container OTU-N into N optical sub-channel transport units OTUsubs by column, where a rate of each OTUsub is equal to the reference rate level; modulating the N optical sub-channel transport units OTUsubs onto one or more optical carriers; and sending the one or more optical carriers onto a same fiber for transmission.

According to another aspect, an embodiment of the present invention provides a transmission apparatus in an optical transport network, where the transmission apparatus includes a constructing module, a mapping module, a splitting module, a modulating module, and a transmitting module. The constructing module is configured to construct a variable-rate container OTU-N, where a rate of the OTU-N is N times as high as a preset reference rate level, and the value N is a positive integer that is configurable as required; the mapping module is configured to map a received client signal into the OTU-N; the splitting module is configured to split the OTU-N, in which the client signal is mapped, into N optical sub-channel transport units OTUsubs by columns, where a rate of each OTUsub is the reference rate level; the modulating module is configured to modulate the N OTUsubs onto one or more optical carriers; and the transmitting module is configured to send the one or more optical carriers onto a same fiber for transmission.

According to another aspect, an embodiment of the present invention provides a method for receiving a client signal in an optical transport network, where the method includes: receiving one or more optical carriers from a same fiber; demodulating the N optical sub-channel transport units OTUsubs out of the one or more optical carriers; aligning the N OTUsubs, where a rate of each OTUsub is a preset reference rate level; multiplexing the aligned N OTUsubs into one variable-rate container OTU-N by interleaving columns, where a rate of the OTU-N is N times as high as the reference rate level, and the value N is a positive integer that is configurable as required; and demapping a client signal from the OTU-N.

According to another aspect, an embodiment of the present invention provides a receiving apparatus in an optical transport network, where the receiving apparatus includes a receiving interface, a demodulating module, an aligning module, a multiplexing module, and a demapping module. The receiving interface is configured to receive one or more optical carriers from a same fiber. The demodulating module is configured to demodulate the N optical sub-channel transport units OTUsubs out of the one or more optical carriers received by the receiving interface. The aligning module is configured to align the N OTUsubs demodulated by the demodulating module. The multiplexing module is configured to multiplex the N OTUsubs, which are aligned by the aligning module, into one variable-rate container OTU-N by interleaving columns, where a rate of the OTU-N is N times as high as the reference rate level, and the value N is a positive integer that is configurable as required. The demapping module is configured to demap a client signal from the OTU-N generated by the multiplexing module.

According to another aspect, an embodiment of the present invention provides a transmission apparatus in an optical transport network, where the apparatus includes at least one processor. The at least one processor is configured to: map a received client signal into a variable-rate container OTU-N, where a rate of the OTU-N is N times as high as a preset reference rate level, and the value N is a positive integer that is configurable as required; split the variable-rate container OTU-N into N optical sub-channel transport units OTUsubs by column, where a rate of each OTUsub is equal to the reference rate level; modulate the N optical sub-channel transport units OTUsubs onto one or more optical carriers; and send the one or more optical carriers onto a same fiber for transmission.

According to another aspect, an embodiment of the present invention provides a receiving apparatus in an optical transport network, where the apparatus includes a demodulator and at least one processor. The demodulator is configured to demodulate N optical sub-channel transport units OTUsubs out of received optical carriers. The at least one processor is configured to: receive one or more optical carriers from a same fiber; demodulate the N optical sub-channel transport units OTUsubs out of the one or more optical carriers; align the N OTUsubs, where a rate of each OTUsub is a preset reference rate level; multiplex the aligned N OTUsubs into one variable-rate container OTU-N by interleaving columns, where a rate of the OTU-N is N times as high as the reference rate level, and the value N is a positive integer that is configurable as required; and demap a client signal from the OTU-N.

In the embodiments, a client signal is mapped into a variable-rate container OTU-N and the OTU-N is transmitted by using the same fiber, so as to be adaptable to change of optical-layer spectrum bandwidths and accomplish optimal configuration of optical transport network bandwidth resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
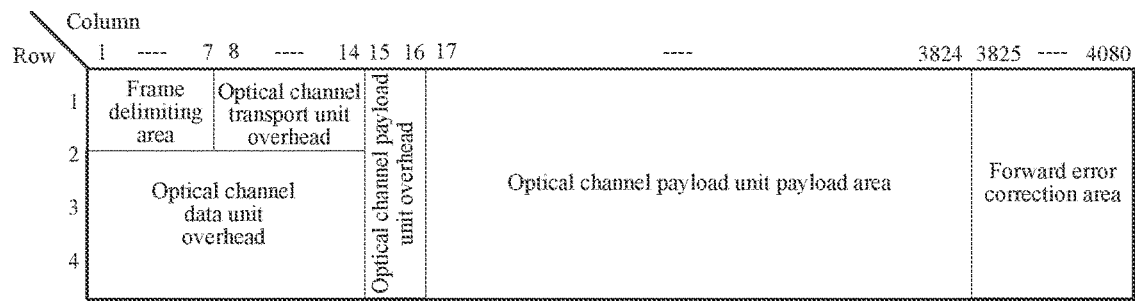
FIG. 1 is a structural diagram of an OTN frame provided in the prior art.
Figure 2:
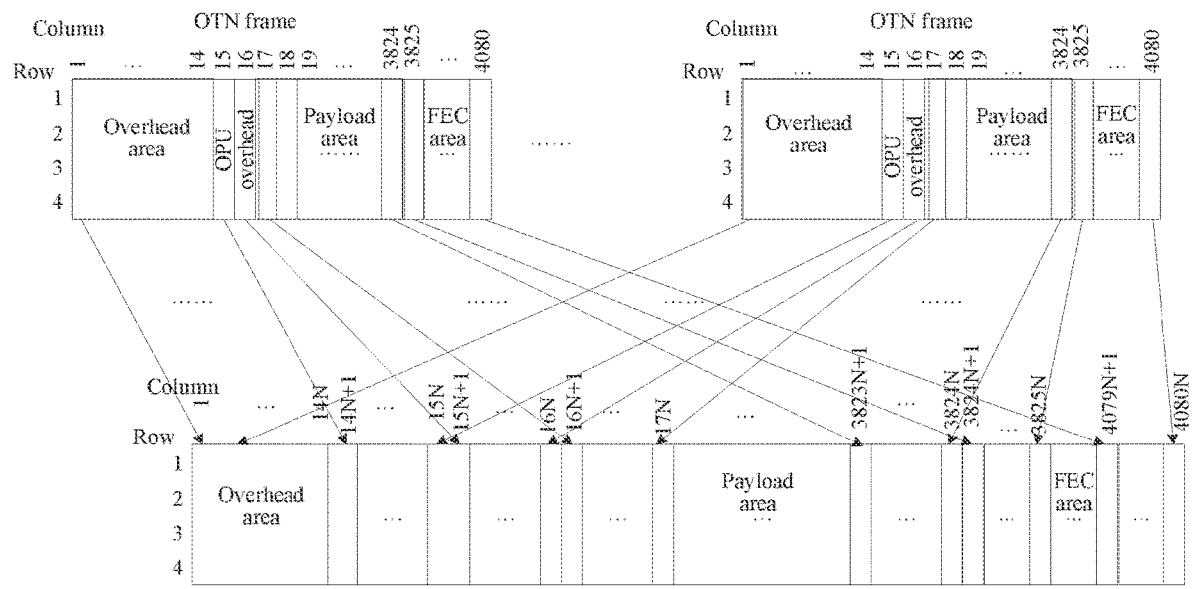
FIG. 2 is a schematic diagram of a frame structure of a variable-rate container OTU-N generated out of an OTN frame by interleaving columns according to an embodiment of the present invention.

To make the objectives, technical solutions, and advantages of the present invention clearer, the following further describes the implementation manners of the present invention in detail with reference to the accompanying drawings.

The embodiments of the present invention construct a variable-rate container structure called OTU-N (Optical channel Transport Unit-N) on an OTN electric layer, where the value N is a configurable positive integer, and a rate of the OTU-N is configurable using a preset reference rate level as a granularity. For example, the rate of the OTU-N is N times as high as the reference rate level. The rate of the OTU-N may be configured flexibly according to a traffic volume of a client signal. The traffic volume of the client signal may be detected by an OTN device, or configured by a management plane.

The value N is configured flexibly according to transmission requirements. Preferably, the value N is determined based on the traffic volume of the client signal and the reference rate level. For example, the value N is equal to a round-up result of dividing the traffic volume of the client signal by the reference rate level. Rounding up a quotient of dividing A by B means that if A is divisible by B, a round-up quotient of dividing A by B is equal to a quotient of dividing A by B; and, if A is not divisible by B, a round-up quotient of dividing A by B is equal to a value of adding 1 to a value obtained by rounding the quotient of dividing A by B. For example, if the traffic volume of the client signal is 200 G and the reference rate level is set to 25 G, the value N is a quotient 8 of dividing 200 G by 25 G, that is, N=8; and, if the traffic volume of the client signal is 180 G and the reference rate level is set to 25 G, the value N is equal to adding 1 to a value 7 obtained by rounding a quotient 7.2 of dividing 180 G by 25 G, that is, N=8.

The preset fixed value of the reference rate level includes but is not limited to the following types:

1. The reference rate level may be a rate of an OTU1, an OTU2, an OTU3, or an OTU4 defined in the ITU-T G.709 standard, that is, the reference rate level is selected among 2.5 G, 10 G, 40 G, and 100 G, and is preferably 100 G, that is, the rate of the OTU4.
2. The reference rate level may be an integral multiple of an optical spectrum grid bandwidth defined in the ITU-T G.694. For example, if the optical spectrum grid bandwidth is 12.5 GHz, the reference rate level is selected among 12.5 G, 25 G, 50 G, and 100 G, and is preferably 25 G.

The client signal includes:
(1) client data, a CBR (Constant Bit Rate) service, and a Packet (packet) service; and
(2) lower-order ODUt services, including an ODU0, an ODU1, an ODU2, an ODU2e, an ODU3, an ODU4, and an ODUflex that are defined in the ITU-T G.709 standard.

A frame structure of the OTU-N varies with the value N, and is formed of N subframes by interleaving columns, and a rate of each subframe is the reference rate level. If the subframe has M columns, which include M1 columns of overhead, M2 columns of payload, and M3 columns of FEC, then the OTU-N has M*N columns, including M1*N columns of overhead, M2*N columns of payload, and M3*N columns of FEC.

Preferably, as shown in FIG. 2 to FIG. 5, the frame structure of the OTU-N is formed of N portions of OTN frames by interleaving columns, and includes 4 rows and 4080*N columns, where a $1^{st}$ column to a $14N^{th}$ column include an OTU-N frame delimiting area, an OTU-N overhead area, and an ODU-N overhead area; the $(14N+1)^{th}$ column to the $16N^{th}$ column are an OPU-N overhead area, the $(16N+1)^{th}$ column to the $3824N^{th}$ column are an OPU-N payload area, and the $(3824N+1)^{th}$ column to the $4080N^{th}$ column are a FEC (forward error correction) overhead area.

Figure 3:
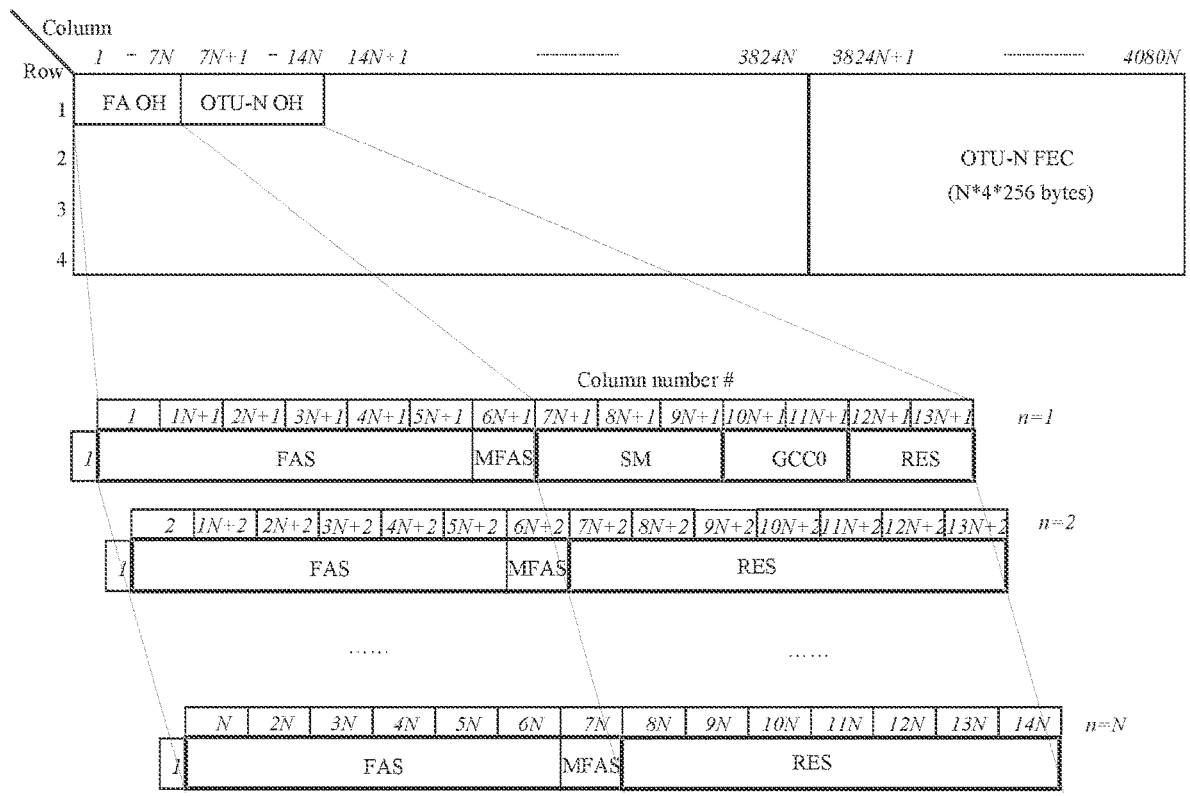
FIG. 3 to FIG. 5 are schematic structural diagrams of a variable-rate container OTU-N according to an embodiment of the present invention.
Figure 4:
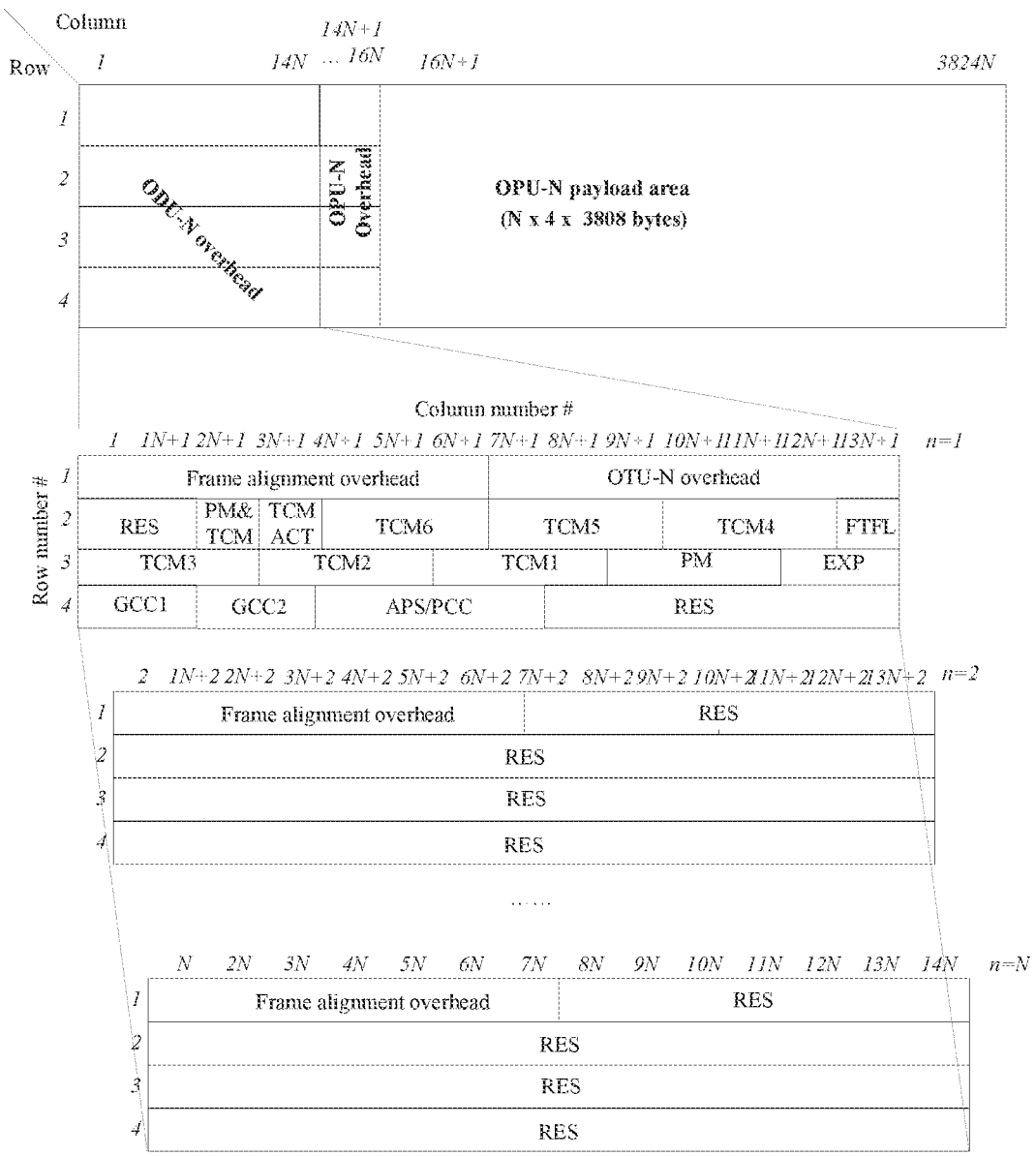
Figure 5:
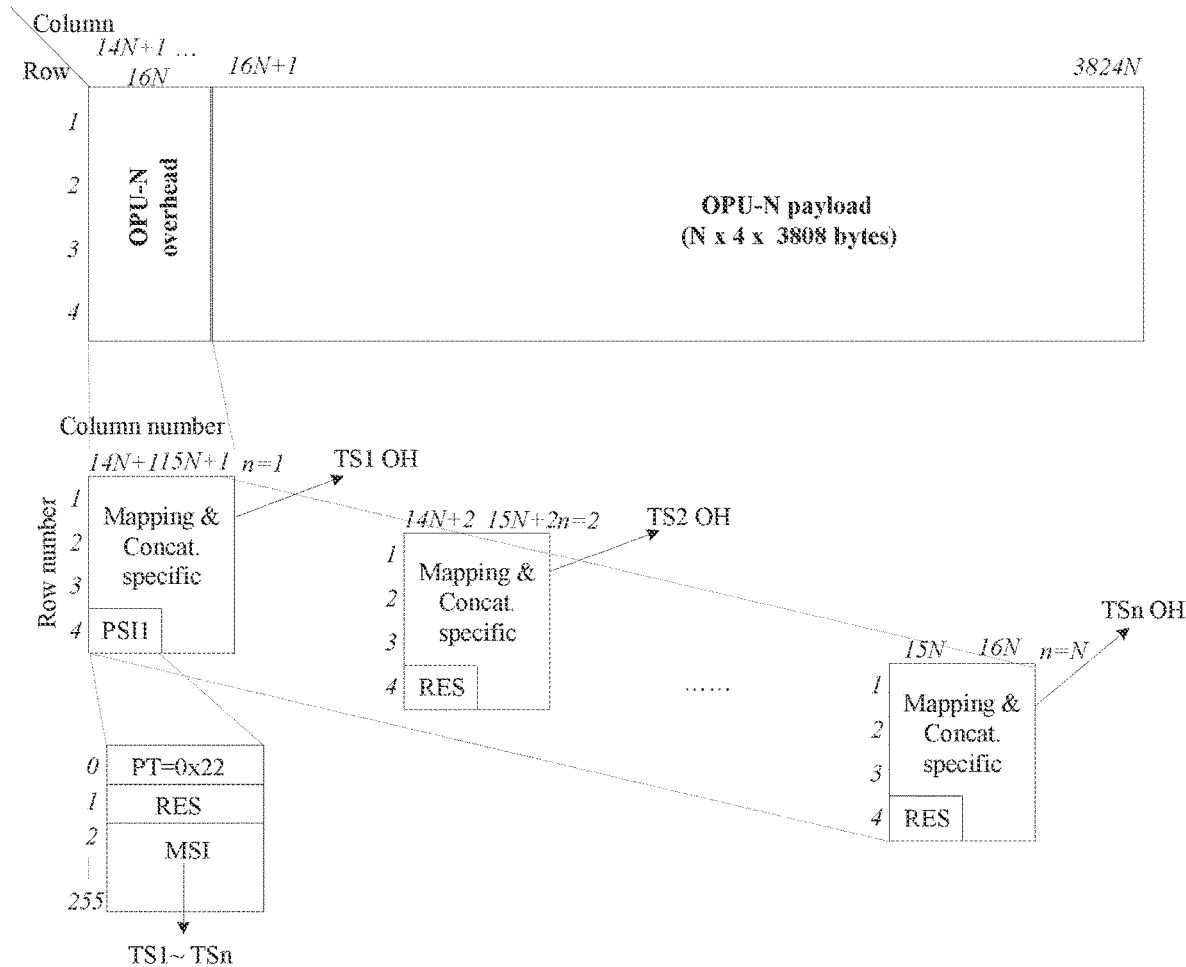

Preferably, as shown in FIG. 3, all overhead information of one of the OTN frames serves as overhead information of the OTU-N, and, for remaining (N−1) OTN frames, only their FAS (Frame Alignment Signal) and MFAS (Multi-frame Alignment Signal) are placed in an overhead area of the first row and the $1^{st}$ to $7N^{th}$ columns of the OTU-N.

Figure 6:
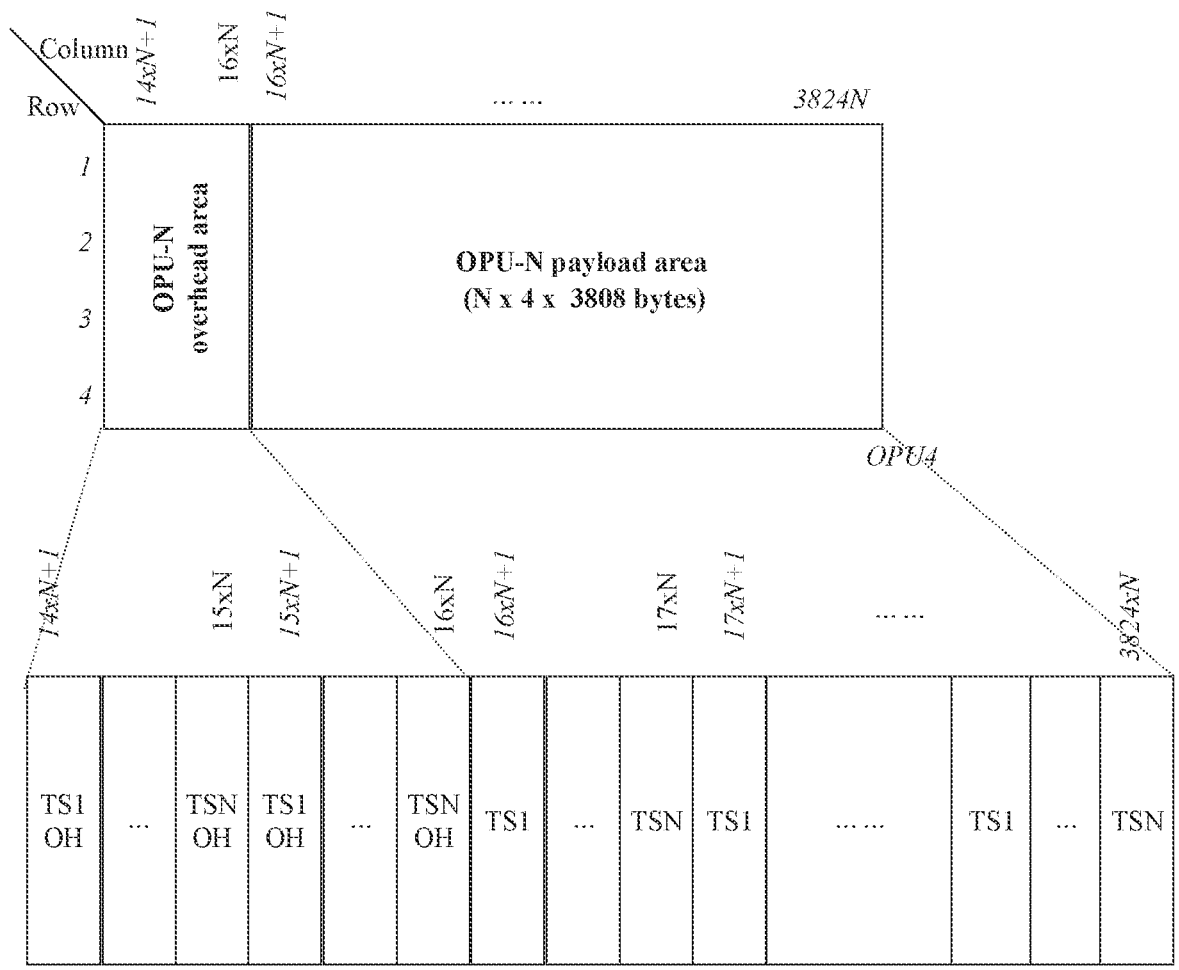
FIG. 6 is a schematic diagram of dividing an optical channel payload unit OPU-N of a variable-rate container OTU-N into tributary slots according to an embodiment of the present invention.

An optical channel data unit corresponding to the OTU-N is called an ODU-N, and an optical channel payload unit corresponding to the OTU-N is called an OPU-N. The following two schemes are available for dividing the OPU-N into TSs (Tributary Slot):

Scheme 1: As shown in FIG. 6, the OPU-N is divided into N tributary slots by column, a rate of each tributary slot is the reference rate level, and the value N mentioned throughout this document has the same value, where the $(14N+1)^{th}$ column to the $16N^{th}$ are a tributary slot overhead area (TSOH), and the $(16N+1)^{th}$ column to the $3824N^{th}$ column are an OPU-N payload area.

Scheme 2: Similar to a manner described in the ITU-T G.709 standard, which divides an OTU4 into 80 tributary slots of 1.25 G, the OTU-N is divided into tributary slots by bytes and using a 1.25 G rate level as a granularity. For example, an OTU4-4 of a 400 G rate level (the OTU4-4 is the OTU-N that is formed of four OTU4s by interleaving columns) may be divided into 320 tributary slots of 1.25 G. In the ITU-T G.709 standard, a manner of dividing the OTU4 is to divide an OPU4 payload area into 80 tributary slots of 1.25 G by interleaving bytes at intervals of 80 multiframes. In the embodiment of the present invention, the manner of dividing the OTU4-4 may be to divide the OPU4-4 payload area into 320 tributary slots of 1.25 G by interleaving bytes at intervals of 80 multiframes.

Figure 7:
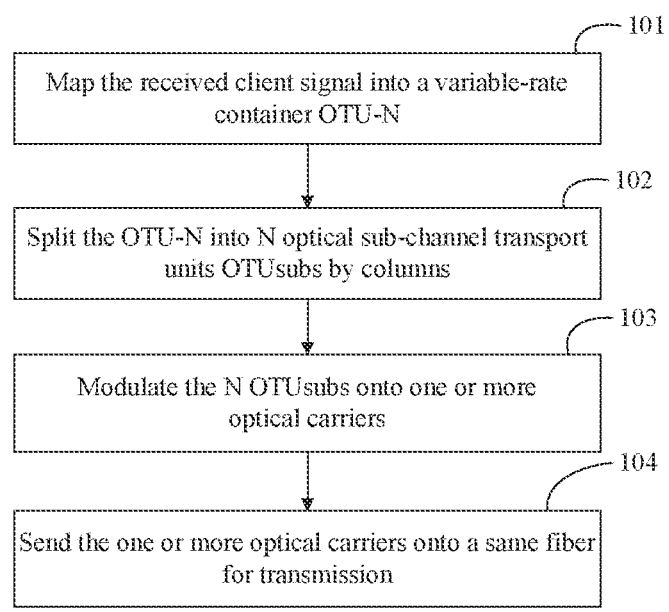
FIG. 7 is a flowchart of a method for transmitting a client signal in an OTN according to an embodiment of the present invention.

Referring to FIG. 7, an embodiment provides a method for transmitting a client signal in an optical transport network. The method includes the following steps:

Step 101: Map a received client signal into an OTU-N.

For client data, the client data is mapped into a tributary slot of an OPU-N by using a GMP (Generic Mapping Procedure) or GFP (Generic Framing Procedure) mapping manner, and then OPU-N overhead is added, ODU-N overhead is added into the OPU-N to form an ODU-N, and OTU-N overhead and FEC (Forward Error Correction) information are added into the ODU-N to form an OTU-N.

For a lower-order ODUt service, one lower-order ODUt service is mapped to an ODTU-N.ts (Optical channel Data Tributary Unit-N) of the OPU-N by using a GMP manner, where ts is the number of OPU-N tributary slots occupied by the lower-order ODUt; the ODTU-N.ts is multiplexed into ts tributary slots of the OPU-N; ODU-N overhead is added into the OPU-N to form an ODU-N; and OTU-N overhead and FEC are added into the ODU-N to form an OTU-N.

Preferably, a granularity of bytes used for mapping each lower-order ODUt is the same as the number of OPU-N tributary slots occupied by the lower-order ODUt. To make it easier for persons skilled in the art to understand the mapping method in this embodiment, the following gives an example with reference to FIG. 8. It is assumed that an OTU-3 carries two lower-order ODUts, where the two lower-order ODUts are a first lower-order ODUt and a second lower-order ODUt. The first lower-order ODUt occupies one tributary slot of the OPU-3, such as TS1; and the second lower-order ODUt occupies two tributary slots of the OPU-3, such as TS2 and TS3. An optical channel data tributary unit of the OPU-3 is called an ODTU-3.ts, where the ODTU-3.ts includes TSOH (tributary slot overhead) and TS payload, and ts is the number of OPU-3 tributary slots occupied by the ODTU-3.ts.

Figure 8:
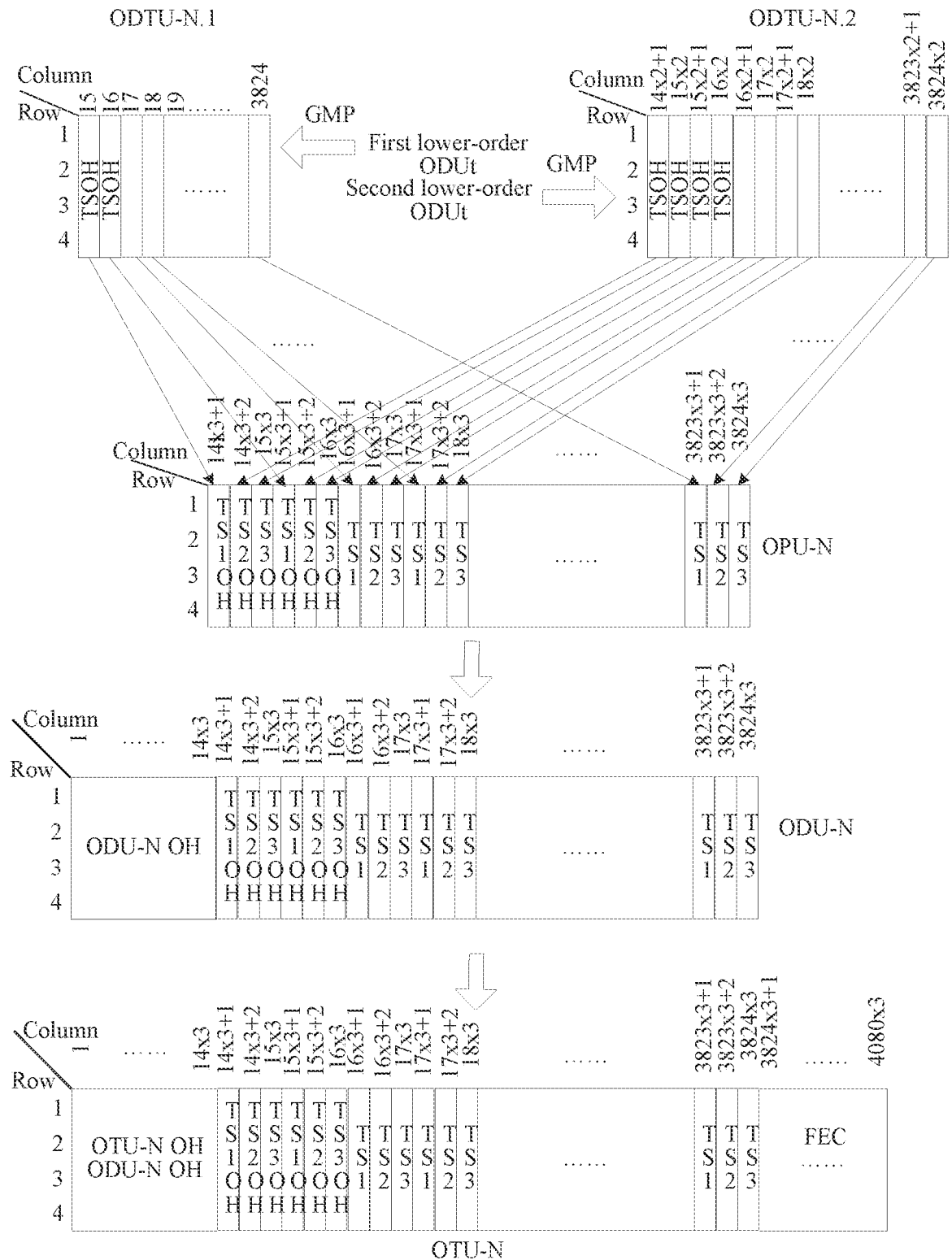
FIG. 8 is a schematic diagram of mapping two lower-order ODUts into a variable-rate container OTU-N according to an embodiment of the present invention.

As shown in FIG. 8, a specific process in which the two lower-order ODUts are mapped and multiplexed to the OTU-3 is as follows:

(1) The first lower-order ODUt is mapped into the ODTU-3.1 at a granularity of 1 byte according to the GMP, where the ODTU-3.1 occupies one tributary slot TS1 of the OPU-3; and mapping information is added into tributary slot overhead TSOH1 corresponding to the tributary slot TS1.

(2) The second lower-order ODUt is mapped into the ODTU-3.2 at a granularity of 2 bytes through GMP, where the ODTU-3.2 occupies two tributary slots TS1 and TS2 of the OPU-3; and mapping information is added into a TSOH corresponding to either of the two tributary slots, for example, added into tributary slot overhead TSOH2 corresponding to the tributary slot TS2.

(3) The ODTU-3.1 and the ODTU-3.2 are multiplexed into one OPU-3, ODU-3 overhead is added into the OPU-3 to generate an ODU-3, and OTU-N overhead is added into the ODU-3 to generate the OTU-3. In this embodiment, a plurality of ODTU-N.tss is multiplexed into one OPU-N to reduce overhead management complexity.

This embodiment inherits a definition manner of PT (Payload Type) in the ITU-T G.709 standard. It is noteworthy that a new PT such as PT=0x22 may be added in this embodiment to indicate that the ODU-N carries a plurality of lower-order services in a hybrid manner.

This embodiment may also inherit a definition manner of an MSI (Multiplex Structure Identifier) in the ITU-T G.709 standard. After the ODU-N mapped to a plurality of ODUts is obtained, the MSI of the ODU-N is modified to indicate whether each tributary slot in the ODU-N is already occupied by the lower-order ODUt service. Certainly, the definition of the PT and the MSI is not limited to the foregoing manners, and is not specifically limited in this embodiment.

Figure 9:
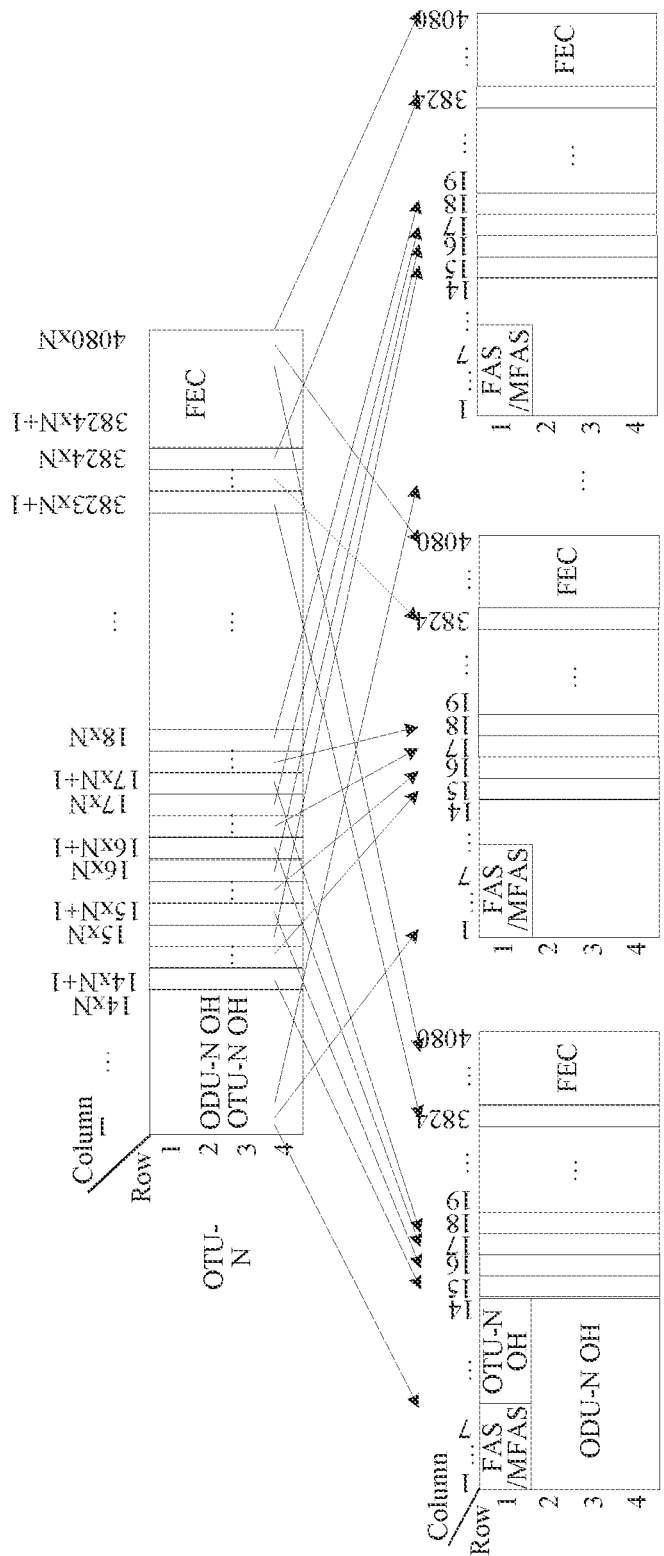
FIG. 9 is a schematic diagram of splitting a variable-rate container OTU-N into a plurality of optical sub-channel transport units OTUsubs by columns according to an embodiment of the present invention.

Step 102: As shown in FIG. 9, the OTU-N is split into N OTUsubs (Optical sub-channel Transport Unit) by columns, where a rate of each OTUsub is the reference rate level.

The following two schemes are available for splitting the OTU-N into N OTUsubs by columns:

Scheme 1: Split the OTU-N into N sub-channels by columns, and perform FEC for each sub-channel and add FEC overhead information to obtain the N OTUsubs. Preferably, one of the sub-channels includes OTU-N overhead, ODU-N overhead, an FAS, and an MFAS, and other N−1 sub-channels include the FAS and the MFAS, where a rate of each sub-channel is equal to the reference rate level. FEC is performed on each sub-channel, which can reduce difficulty of FEC.

Scheme 2: Perform FEC for the OTU-N and add the FEC overhead information to obtain processed OTU-N, and split the processed OTU-N into the N OTUsubs by columns. Preferably, one of the OTUsubs includes the OTU-N overhead, the ODU-N overhead, the FAS, and the MFAS, and other N−1 OTUsubs include the FAS and the MFAS, where the rate of each OTUsub is equal to the reference rate level.

Figure 10:
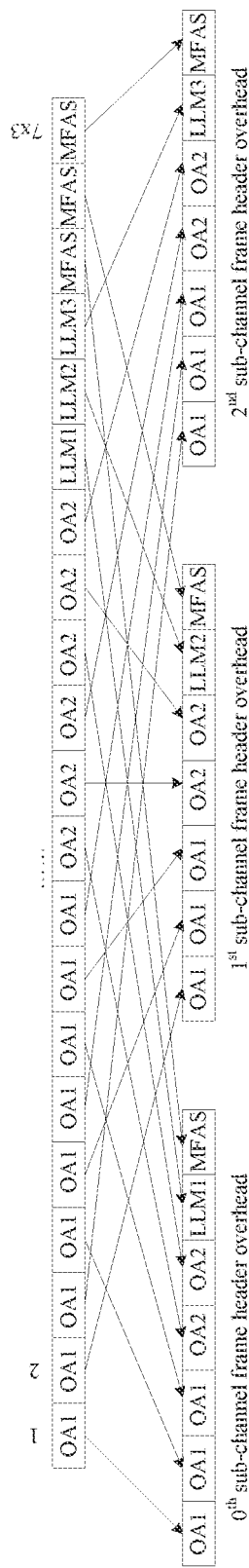
FIG. 10 is a schematic diagram of splitting a frame header of a variable-rate container OTU-3 by columns according to an embodiment of the present invention.

In this embodiment, to facilitate identification of each OTUsub, the OTUsub may also carry an LLM (Logical Lane Marker). The logical lane marker occupies a 6th byte of the FAS, and is denoted by LLMi, where the LLMi is a lane marker of each OTUsub, and its value range may be 0 to 255. The LLMi 0 to 255 mark the 0th to 255th OTUsubs respectively. If the number of OTUsubs is greater than 256, an extended definition may be performed in a reserved area of in other overhead. Using three OTUsubs as an example, a frame header of the OTUsub is shown in FIG. 10, the values of the logical lane markers LLM1, LLM2, and LLM3 carried in the 0th to 2nd OTUsubs are 0, 1, and 2 respectively, and occupy the 6th byte of frame header overhead, where OA1 and OA2 represent other overhead of the OTUsub frame header, which is not specifically limited in this embodiment. The 7th byte is an MFAS byte, which is not repeated in this embodiment.

Step 103: Modulate the N OTUsubs onto one or more optical carriers.

(1) For a single carrier, the N OTUsubs are modulated onto a single optical carrier.

For example, assuming that a traffic volume of the client signal is 400 G and that the reference rate level of the OTU-N is set to 100 G, the value N is equal to 4, and a bearer bandwidth of the single carrier is set to 400 G.

The number of optical spectrum grid bandwidths occupied by the single carrier and an applied modulation format (a modulation order is k) are not limited. For example, if the single carrier occupies four 12.5 G optical spectrum grid bandwidths, then a PM-16QAM (Polarization Multiplexing-16th-order quadrature amplitude modulation) modulation format (the modulation order is 16) is used. Calculated by using a formula $2*4*12.5 \text{ Gbit/s}*\log_2 16$, the bandwidth of the single carrier may be up to 400 G bandwidth, which meets a requirement of transmitting the client signal.

If the single carrier occupies eight 12.5 G optical spectrum grid bandwidths, then a 16QAM (16th-order quadrature amplitude modulation) modulation format (the modulation order is 16) is used. Calculated by using a formula $8*12.5 \text{ Gbit/s}*\log_2 16$, the bandwidth of the single carrier may also be up to 400 G, which meets the requirement of transmitting the client signal.

(2) For a plurality of optical subcarriers, when the N OTUsubs are modulated onto M subcarriers, the N OTUsubs are divided into M groups, where the value M is a positive integer, and each group of OTUsubs is modulated onto a subcarrier. The value N is configured as an integral multiple of the value M. For example, the value M may be set to a rounded-up quotient of dividing the traffic volume of the client signal by the bearer bandwidth of one subcarrier. Preferably, N is equal to M. Preferably, the M subcarriers may employ an orthogonal frequency division multiplexing manner.

For example, assuming that the traffic volume of the client signal is 400 G and that the reference rate level of the OTU-N is set to 25 G, the value N is equal to 16. That is, the OTU-16 is split into 16 OTUsubs, and the bearer bandwidth of the M subcarriers is set to 400 G to meet the requirement of transmitting the client signal.

If the bearer bandwidth of each subcarrier is 50 G, the value M is set to 8. That is, 16 OTUsubs are modulated onto 8 subcarriers for transmission. In this case, every 2 OTUsubs are modulated onto one subcarrier.

The number (m) of optical spectrum grid bandwidths occupied by each subcarrier and the used modulation format (the modulation order is k) are not limited. For example, if each subcarrier occupies four 12.5 G optical spectrum grid bandwidths, then a BPSK (Binary Phase Shift Keying) modulation format (the modulation order is 2) is used. Calculated by using a formula $4*12.5$ Gbit/s$*\log_2 2$, the bandwidth of each subcarrier may be up to 50 G.

If each subcarrier occupies one 12.5 G optical spectrum grid bandwidth, then a PM-QPSK (Polarization Multiplexing-polarization multiplexing quadrature phase shift keying) modulation format (the modulation order is 4) is used. Calculated by using a formula $2*12.5$ Gbit/s$*\log_2 4$, the bandwidth of each subcarrier may also be up to 50 G.

Step 104: Send the one or more optical carriers onto a same fiber for transmission.

In this embodiment, a client signal is mapped into a variable-rate container OTU-N and the OTU-N is transmitted by using a same fiber, so as to be adaptable to change of optical-layer spectrum bandwidths and accomplish optimal configuration of optical transport network bandwidth resources.

Figure 11:
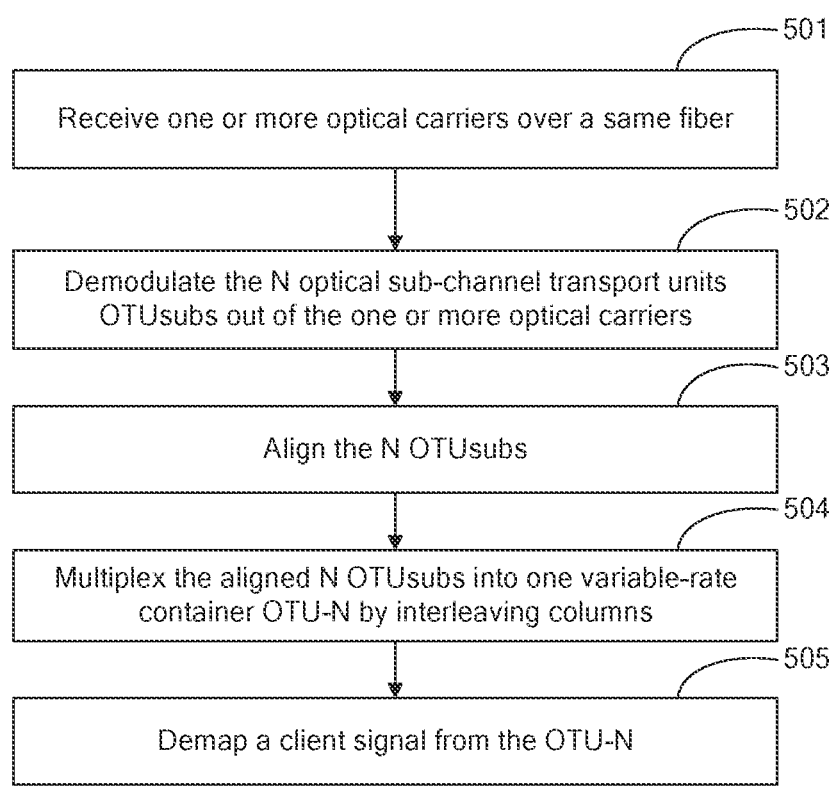
FIG. 11 is a flowchart of a method for receiving a client signal in an optical transport network according to an embodiment of the present invention.

Referring to FIG. 11, corresponding to the foregoing method for transmitting a client signal in an OTN, an embodiment provides a method for receiving a client signal in an optical transport network, including:

Step 501: Receive one or more optical carriers from a same fiber.

Step 502: Demodulate the N OTUsubs (optical sub-channel transport unit) out of the one or more optical carriers.

Step 503: Align the N OTUsubs, where a rate of each OTUsub is a preset reference rate level.

The aligning the N OTUsubs includes: performing frame delimiting for the N OTUsubs according to an FAS (Frame Alignment Signal) of each OTUsub, and aligning frame headers of the N OTUsubs that have undergone the frame delimiting.

In this embodiment, optionally, in the aligning, the N OTUsubs may be aligned based on frame headers, and the N OTUsubs may be further aligned by using the MFAS carried in each OTUsub. That is, after the N OTUsubs are aligned, not only the frame headers keep aligned, but also the MFAS (Multiframe Alignment Signal) carried in each OTUsub needs to keep consistent. An alignment manner applied in a specific implementation process is not specifically limited in this embodiment.

Step 504: Multiplex the aligned N OTUsubs into one OTU-N by interleaving columns, where a rate of the OTU-N is N times as high as the reference rate level, and the value N is a positive integer that is configurable as required.

Optionally, the following two schemes are available for multiplexing the aligned N OTUsubs into one OTU-N by interleaving columns:

Scheme 1: Perform FEC decoding for the aligned N OTUsubs, and then multiplex the N OTUsubs, which have undergone the FEC decoding, into one OTU-N by interleaving columns.

Scheme 2: Multiplex the aligned N OTUsubs into one OTU-N by interleaving columns, and perform the FEC decoding for the OTU-N.

Step 505: Demap a client signal from the OTU-N.

The demapping a client signal from the OTU-N includes: parsing OPU-N (optical channel payload unit) overhead of the OTU-N to obtain mapping information carried in tributary slot overhead corresponding to each tributary slot in the OTU-N; and demapping the client signal from each tributary slot payload area of the OTU-N based on the mapping information.

Figure 12:
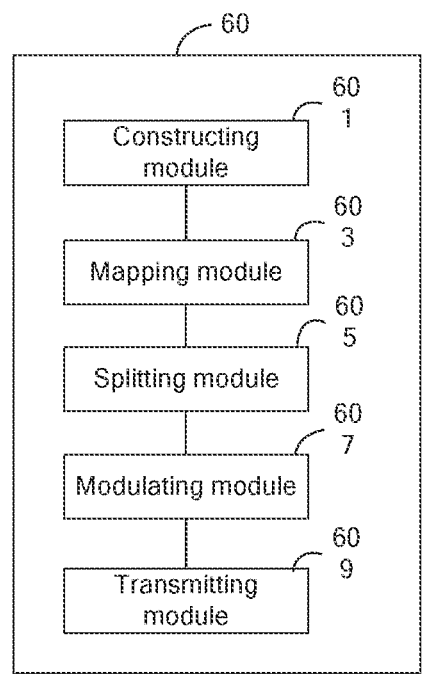
FIG. 12 is a schematic diagram of a transmission apparatus in an optical transport network according to an embodiment of the present invention.

Referring to FIG. 12, an embodiment provides a transmission apparatus in an optical transport network. The transmission apparatus 60 includes a constructing module 601, a mapping module 603, a splitting module 605, a modulating module 607, and a transmitting module 609.

The constructing module 601 is configured to construct a variable-rate container structure that is called an OTU-N, where a rate of the OTU-N is N times as high as a preset reference rate level, the value N is a configurable positive integer, the value N is flexibly configurable depending on transmission requirements, and preferably, the value N is determined based on a traffic volume of the client signal and the reference rate level.

The mapping module 603 is configured to map a received client signal into the OTU-N constructed by the constructing module 601.

For client data, the client data is mapped by the mapping module 603 into a tributary slot of an OPU-N by using a GMP (Generic Mapping Procedure) or GFP (Generic Framing Procedure) mapping manner, and then OPU-N overhead is added, ODU-N overhead is added into the OPU-N to form an ODU-N, and OTU-N overhead and FEC (Forward Error Correction) information are added into the ODU-N to form an OTU-N.

For a lower-order ODUt service, one lower-order ODUt service is mapped by the mapping module 603 to an ODTU-N.ts (Optical channel Data Tributary Unit-N) of the OPU-N by using a GMP mapping manner, where ts is the number of OPU-N tributary slots occupied by the lower-order ODUt; the ODTU-N.ts is multiplexed into ts tributary slots of the OPU-N; ODU-N overhead is added into the OPU-N to form an ODU-N; and OTU-N overhead and FEC are added into the ODU-N to form an OTU-N. Preferably, a granularity of bytes used by the mapping module 603 for mapping each lower-order ODUt is the same as the number of OPU-N tributary slots occupied by the lower-order ODUt.

As shown in FIG. 9, the splitting module 605 is configured to split the OTU-N, in which the client signal is mapped by the mapping module 603, into N OTUsubs (Optical sub-channel Transport Unit) by columns, where a rate of each OTUsub is the reference rate level.

The following two schemes are available for the splitting module 605 to split the OTU-N into N OTUsubs by columns:

Scheme 1: Split the OTU-N into N sub-channels by columns, and perform FEC for each sub-channel and add FEC overhead information to obtain the N OTU-subs. Preferably, one of the sub-channels includes OTU-N overhead, ODU-N overhead, an FAS, and an MFAS, and other N−1 sub-channels include the FAS and the MFAS, where the rate of each sub-channel is equal to the reference rate level. FEC is performed on each sub-channel, which can reduce difficulty of FEC.

Scheme 2: Perform FEC for the OTU-N and add the FEC overhead information to obtain processed OTU-N, and split the processed OTU-N into the N OTUsubs by columns. Preferably, one of the OTUsubs includes the OTU-N overhead, the ODU-N overhead, the FAS, and the MFAS, and other N−1 OTUsubs include the FAS and the MFAS, where the rate of each OTUsub is equal to the reference rate level.

The modulating module 607 is configured to modulate the N OTUsubs, which is a result of splitting by the splitting module 605, onto one or more optical carriers.

(1) For a single carrier, the modulating module 607 modulates the N OTUsubs onto a single optical carrier.

(2) For a plurality of optical subcarriers, for example, when the modulating module 607 modulates the N OTUsubs to M subcarriers, the N OTUsubs are divided into M groups, where the value M is a positive integer; and each group of OTUsubs is modulated onto a subcarrier. The value N is set to an integral multiple of the value M. Preferably, N is equal to M. Preferably, the M subcarriers may employ an orthogonal frequency division multiplexing manner.

The transmitting module 609 is configured to send the one or more optical carriers, which are modulated by the modulating module 607, onto a same fiber for transmission.

It is noteworthy that each module included in the embodiments of the transmission and receiving apparatuses is merely sorted according to functional logics but is not limited to the sorting so long as the corresponding functions can be implemented. In addition, a specific name of each functional module is merely intended for differentiating one another rather than limiting the protection scope of the present invention.

Figure 13:
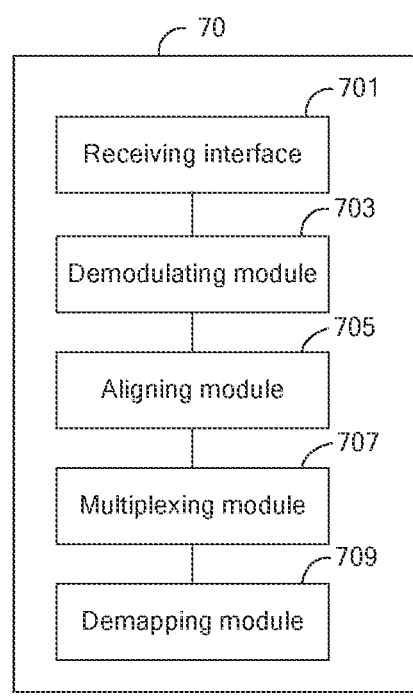
FIG. 13 is a schematic diagram of a receiving apparatus in an optical transport network according to an embodiment of the present invention.

Referring to FIG. 13, an embodiment provides a receiving apparatus in an optical transport network. The receiving apparatus 70 includes a receiving interface 701, a demodulating module 703, an aligning module 705, a multiplexing module 707, and a demapping module 709.

The receiving interface 701 is configured to receive one or more optical carriers from a same fiber.

The demodulating module 703 is configured to demodulate the N OTUsubs (optical sub-channel transport unit) out of the one or more optical carriers received by the receiving interface 701.

The aligning module 705 is configured to align the N OTUsubs demodulated by the demodulating module 703.

Figure 14:
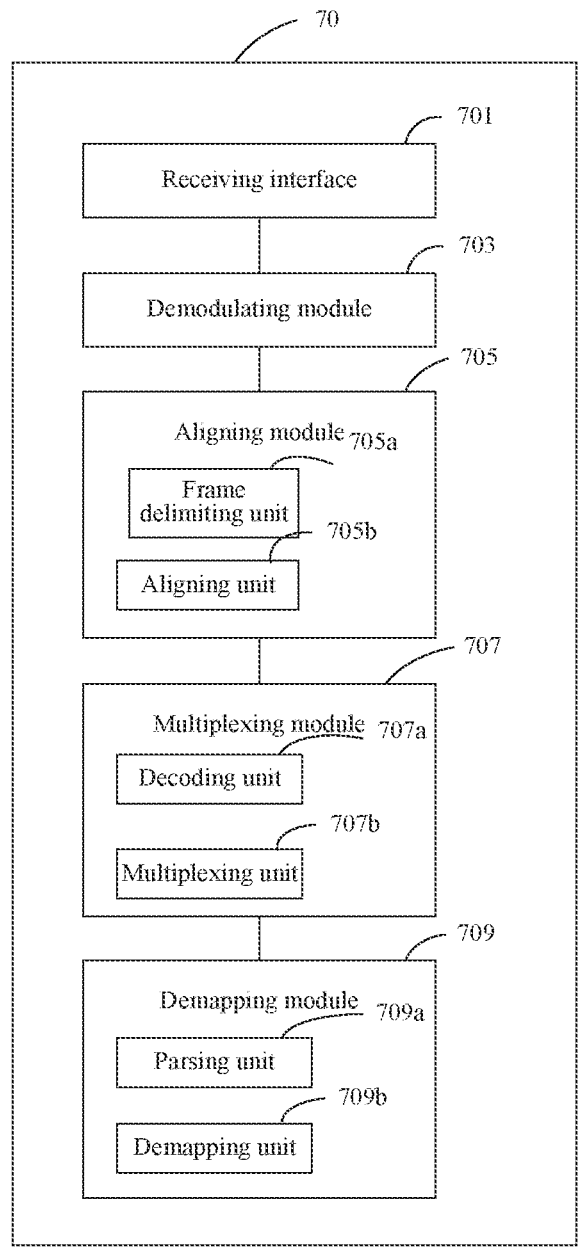
FIG. 14 is a schematic diagram of another receiving apparatus in an optical transport network according to an embodiment of the present invention.

As shown in FIG. 14, the aligning module 705 includes a frame delimiting unit 705a and an aligning unit 705b. The frame delimiting unit 705a is configured to perform frame delimiting for the N OTUsubs according to a frame alignment signal (FAS) of each OTUsub, and the aligning module 705b is configured to align frame headers of the N OTUsubs that have undergone the frame delimiting.

The multiplexing module 707 is configured to multiplex the N OTUsubs, which are aligned by the aligning module 705, into one variable-rate container OTU-N by interleaving columns, where a rate of the OTU-N is N times as high as the reference rate level, and the value N is a positive integer that is configurable as required.

Referring to FIG. 14, the multiplexing module 707 includes a decoding unit 707a and a multiplexing unit 707b. Optionally, the decoding unit 707a is configured to perform FEC decoding for the aligned N OTUsubs; and the multiplexing unit 707b is configured to multiplex the N OTUsubs, which have undergone the FEC decoding, into one OTU-N by interleaving columns.

In another embodiment, the multiplexing unit 707b is configured to multiplex the aligned N OTUsubs into one OTU-N by interleaving columns; and the decoding unit 707a is configured to perform the FEC decoding for the OTU-N.

The demapping module 709 is configured to demap a client signal from the OTU-N generated by the multiplexing module 707.

Referring to FIG. 14, the demapping module 709 includes a parsing unit 709a and a demapping unit 709b. The parsing module 709a is configured to parse OPU-N (optical channel payload unit) overhead of the OTU-N to obtain mapping information carried in tributary slot overhead corresponding to each tributary slot in the OTU-N; and the demapping unit 709b is configured to demap the client signal from each tributary slot payload area of the OTU-N based on the mapping information.

The transmission and receiving apparatuses provided in the embodiments may be based on a same conception as the embodiment of methods for transmitting and receiving a client signal respectively. For their specific implementation process, refer to the method embodiments, and no further details is provided herein.

It is noteworthy that each module included in the embodiments of the transmission and receiving apparatuses is merely sorted according to functional logics but is not limited to the sorting so long as the corresponding functions can be implemented. In addition, a specific name of each functional module is merely intended for differentiating one another rather than limiting the protection scope of the present invention.

Figure 15:
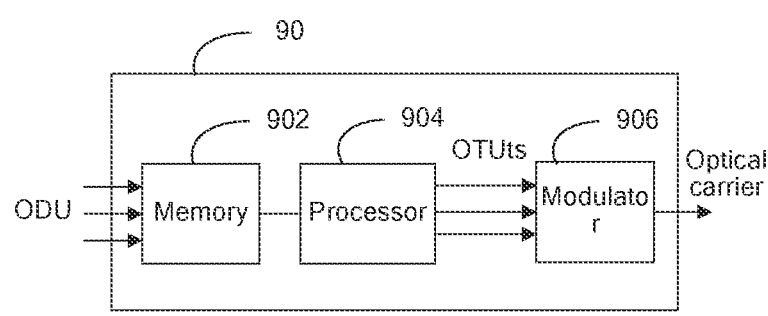
FIG. 15 is a block diagram of a transmission apparatus in an optical transport network according to an embodiment of the present invention.

Refer to FIG. 15, which is a block diagram of an embodiment of a transmission apparatus in an optical transport network. The transmission apparatus 90 includes at least one processor 904, where the at least one processor 904 may be connected to a memory 902, and the memory 902 is configured to buffer a received client signal.

The at least one processor 904 is configured to perform the following operations: constructing a variable-rate container structure that is called an OTU-N, where a rate of the OTU-N is N times as high as a preset reference rate level, and the value N is a configurable positive integer; mapping the received client signal into an OTU-N; splitting the OTU-N into N OTUsubs (Optical sub-channel Transport Unit) by columns, where a rate of each OTUsub is the reference rate level; modulating the N OTUsubs onto one or more optical carriers; and sending the one or more optical carriers onto a same fiber for transmission.

The value N is flexibly configurable depending on transmission requirements, and preferably, the value N is determined based on a traffic volume of the client signal and the reference rate level.

For client data, the client data is mapped by the at least one processor 904 into a tributary slot of an OPU-N by using a GMP (Generic Mapping Procedure) or GFP (Generic Framing Procedure) mapping manner, and then OPU-N overhead is added, ODU-N overhead is added into the OPU-N to form an ODU-N, and OTU-N overhead and FEC (Forward Error Correction) information are added into the ODU-N to form an OTU-N.

For lower-order ODUt services, one lower-order ODUt service is mapped by the at least one processor 904 to an ODTU-N.ts (Optical channel Data Tributary Unit-N) of the OPU-N by using a GMP manner, where ts is the number of OPU-N tributary slots occupied by the lower-order ODUt; the ODTU-N.ts is multiplexed into ts tributary slots of the OPU-N; ODU-N overhead is added into the OPU-N to form an ODU-N; and OTU-N overhead and FEC are added into the ODU-N to form an OTU-N. Preferably, a granularity of bytes used by the at least one processor 904 for mapping each lower-order ODUt is the same as the number of OPU-N tributary slots occupied by the lower-order ODUt.

The following two schemes are available for the at least one processor 904 to split the OTU-N into N OTUsubs by columns:

Scheme 1: Split the OTU-N into N sub-channels by columns, and perform FEC for each sub-channel and add FEC overhead information to obtain the N OTU-subs. Preferably, one of the sub-channels includes OTU-N overhead, ODU-N overhead, an FAS, and an MFAS, and other N−1 sub-channels include the FAS and the MFAS, where the rate of each sub-channel is equal to the reference rate level. FEC is performed on each sub-channel, which can reduce difficulty of FEC.

Scheme 2: Perform FEC for the OTU-N and add the FEC overhead information to obtain processed OTU-N, and split the processed OTU-N into the N OTUsubs by columns. Preferably, one of the OTUsubs includes the OTU-N overhead, the ODU-N overhead, the FAS, and the MFAS, and other N−1 OTUsubs include the FAS and the MFAS, where the rate of each OTUsub is equal to the reference rate level.

For a single carrier, the at least one processor 904 modulates the N OTUsubs onto a single optical carrier.

For a plurality of optical subcarriers, for example, when the at least one processor 904 modulates the N OTUsubs to M subcarriers, the N OTUsubs are divided into M groups, where the value M is a positive integer, and each group of OTUsubs is modulated onto a subcarrier. The value N is set to an integral multiple of the value M. Preferably, N is equal to M. Preferably, the M subcarriers may employ an orthogonal frequency division multiplexing manner.

Figure 16:
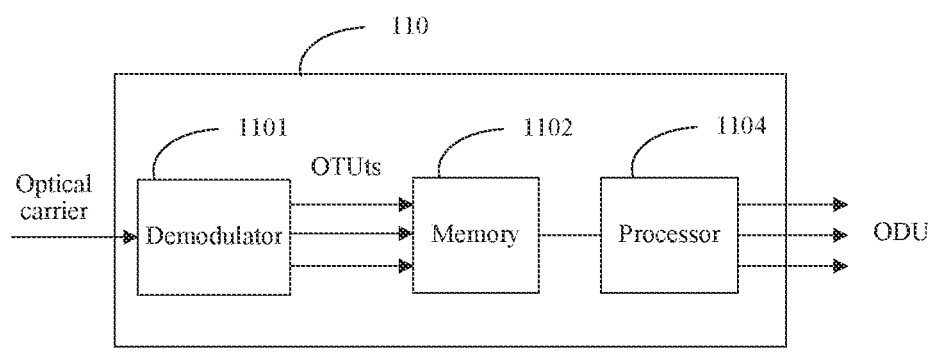
FIG. 16 is a block diagram of a receiving apparatus in an optical transport network according to an embodiment of the present invention.

Refer to FIG. 16, which is a block diagram of an embodiment of a receiving apparatus in an optical transport network. The receiving apparatus 110 includes a demodulator 1101 and at least one processor 1104, where the at least one processor 1104 may be connected to a memory 1102. The demodulator 1101 demodulates N OTUsubs (optical sub-channel transport unit) out of received optical carriers, where the value N is a positive integer that is configurable as required. The memory 1102 is configured to buffer the N OTUs demodulated by the demodulator 1101.

The at least one processor 1104 is configured to perform the following operations: receiving one or more optical carriers from a same fiber; demodulating the N OTUsubs (optical sub-channel transport unit) out of the one or more optical carriers; aligning the N OTUsubs; multiplexing the aligned N OTUsubs into one variable-rate container OTU-N by interleaving columns, where a rate of the OTU-N is N times as high as a preset reference rate level, and the value N is a positive integer that is configurable as required; and demapping a client signal from the OTU-N.

The aligning, by the at least one processor 1104, the N OTUsubs, includes: performing frame delimiting for the N OTUsubs according to a frame alignment signal (FAS) of each OTUsub, and aligning frame headers of the N OTUsubs that have undergone the frame delimiting.

The following two schemes are available for the at least one processor 1104 to multiplex the aligned N OTUsubs into one OTU-N by interleaving columns:

Scheme 1: Perform FEC decoding for the aligned N OTUsubs, and then multiplex the N OTUsubs, which have undergone the FEC decoding, into one OTU-N by interleaving columns.

Scheme 2: Multiplex the aligned N OTUsubs into one OTU-N by interleaving columns, and perform the FEC decoding for the OTU-N.

The demapping, by the at least one processor 1104, a client signal from the OTU-N, includes: parsing OPU-N (optical channel payload unit) overhead of the OTU-N to obtain mapping information carried in tributary slot overhead corresponding to each tributary slot in the OTU-N; and demapping the client signal from each tributary slot payload area of the OTU-N based on the mapping information.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for transmitting a client signal in an optical transport network (OTN), the method comprising:
   mapping, by a transmitter, the client signal into an optical channel transport unit-N(OTU-N), wherein a rate of the OTU-N is N times a preset reference rate, the OTU-N has N subframes, each of the N subframes has 4 rows and 3824 columns, and N is a positive integer larger than one; and
   sending, by the transmitter, the OTU-N.

2. The method according to claim 1, wherein the method comprising: splitting, by the transmitter, the OTU-N into N optical sub-channel transport units (OTUsubs), wherein a rate of each of the N OTUsubs equals the preset reference rate.

3. The method according to claim 1, wherein the OTU-N comprises N OTUsubs, one of the N OTUsubs comprises an OTU-N overhead.

4. The method according to claim 1, wherein each of the N subframes has M columns.

5. The method according to claim 1, wherein N is configured based on a traffic volume of the client signal.

6. The method according to claim 1, wherein the preset reference rate is fixed for multiple types of client signals.

7. A transmission apparatus for use in an optical transport network (OTN), the transmission apparatus comprising:
   at least one processor; and
   a non-transitory computer-readable storage medium including computer-executable instructions, when executed by the at least one processor, cause the transmission apparatus to:
   map a client signal into an optical channel transport unit-N(OTU-N), wherein a rate of the OTU-N is N times a preset reference rate, the OTU-N has N subframes, each of the N subframes has 4 rows and 3824 columns, and N is a positive integer larger than one; and
   send the OTU-N.

8. The transmission apparatus according to claim 7, wherein the computer-executable instructions, when executed by the at least one processor, further cause the transmission apparatus to:

split the OTU-N into N optical sub-channel transport units (OTUsubs), wherein a rate of each of the N OTUsubs equals the preset reference rate.

9. The transmission apparatus according to claim 7, wherein the OTU-N comprises N OTUsubs, one of the N OTUsubs comprises an OTU-N overhead.

10. The transmission apparatus according to claim 7, wherein each of the N subframes has M columns.

11. The transmission apparatus according to claim 7, wherein N is configured based on a traffic volume of the client signal.

12. The transmission apparatus according to claim 7, wherein the preset reference rate is fixed for multiple types of client signals.

13. A receiving apparatus in an optical transport network (OTN), the receiving apparatus comprising:

at least one processor; and a non-transitory computer-readable storage medium including computer-executable instructions which, when executed by the at least one processor, cause the receiving apparatus to:

receive an optical channel transport unit-N(OTU-N), wherein a rate of the OTU-N is N times a preset reference rate, the OTU-N has N subframes, each of the N subframes has 4 rows and 3824 columns, and N is a positive integer larger than one; and demap a client signal from the OTU-N.

14. The receiving apparatus according to claim 13, wherein the computer-executable instructions, when executed by the at least one processor, further cause the receiving apparatus to:

receive N optical sub-channel transport units (OTUsubs), wherein a rate of each of the N OTUsubs equals the preset reference rate; and multiplex the N OTUsubs into one OTU-N.

15. The receiving apparatus according to claim 14, wherein the computer-executable instructions, when executed by the at least one processor, further cause the receiving apparatus to:

align the N OTUsubs, and multiplex the aligned N OTUsubs into one OTU-N.

16. The receiving apparatus according to claim 13, wherein the OTU-N comprises NOTUsubs, one of the N OTUsubs comprises an OTU-N overhead.

17. The receiving apparatus according to claim 13, wherein each of the N subframes has M columns.

* * * * *